United States Patent [19]

Schwarz

[11] 4,326,883
[45] Apr. 27, 1982

[54] PROCESS FOR DEOILING AND AGGLOMERATING OIL-BEARING MILL SCALE

[75] Inventor: Arthur M. Schwarz, Munster, Ind.

[73] Assignee: Inland Steel Company, Chicago, Ill.

[21] Appl. No.: 56,331

[22] Filed: Jul. 10, 1979

[51] Int. Cl.³ .............................. C21B 3/04; C22B 7/02
[52] U.S. Cl. ................................................. 75/5; 75/3; 75/25; 264/111; 264/117; 264/122
[58] Field of Search .............................. 75/3–5, 75/33–37, 25, 44 R, 44 S, 25; 264/111, 117, 122

[56] References Cited

U.S. PATENT DOCUMENTS

| | | | |
|---|---|---|---|
| 1,994,378 | 3/1935 | Williams et al. | 75/48 |
| 1,994,379 | 3/1935 | William et al. | 75/48 |
| 2,065,618 | 12/1936 | Sherwood | 75/22 |
| 2,995,438 | 8/1961 | Subervie et al. | 75/5 |
| 3,340,044 | 9/1967 | MacAfee et al. | 75/40 |
| 3,684,478 | 8/1972 | Fegan et al. | 75/3 |
| 3,767,179 | 10/1973 | Larson | 75/44 S |
| 4,213,779 | 7/1980 | Caswell | 75/3 |

FOREIGN PATENT DOCUMENTS

53-13322  5/1978  Japan .......................................... 75/5
2017670  10/1979  United Kingdom ..................... 75/25

OTHER PUBLICATIONS

Ball, D. F., et al. *Agglomeration of Iron Ores*; Am. Elsevier Pub. Co., New York, N.Y.; pp. 40, 41, 306, 307, (1973).

*Primary Examiner*—Michael L. Lewis
*Attorney, Agent, or Firm*—Merriam, Marshall & Bicknell

[57] ABSTRACT

A novel process and apparatus are provided for deoiling and agglomerating mill scale to form deoiled pellets suitable for use in a sinter mix without objectionable evolution of oil vapors during the sintering process. In general, the process comprises (a) forming a mix of oil-bearing mill scale and calcined lime fines; (b) balling the mix to form green mill scale-lime pellets; and (c) heating the green pellets in an oxidizing atmosphere to a temperature sufficient to effect ignition and substantially complete combustion of the oil in the pellets. In most cases it is preferred to dry the green pellets from step (b) at a low temperature prior to heating in step (c).

24 Claims, 2 Drawing Figures

PROCESS FOR DEOILING AND AGGLOMERATING OIL-BEARING MILL SCALE

This invention relates to the deoiling and agglomeration of oil-bearing mill scale to form small pellets suitable for use in a sinter mix.

BACKGROUND OF THE INVENTION

Mill scale is iron oxide formed on the surfaces of steel slabs, blooms, or the like during hot rolling operations in a steel mill. It is customary to effect mechanical removal of the mill scale by means of scale breakers or high pressure water sprays. The mill scale is collected in a scale pit as a thick slurry or sludge which may contain on the order of 10–15% water. In addition, the mill scale contains on the order of ½ to 1% oil as a contaminant resulting from the use of hydrocarbon oil as a lubricant in various portions of the rolling equipment. Mill scale has a high iron content, for example, on the order of 70%, and is therefore a valuable material if it can be utilized in a steelmaking operation.

Heretofore, it has been customary to utilize mill scale as a component of the sinter mix fed to a sintering line. However, it has been found that almost 100% of the oil contained in mill scale used for sintering is removed from the sinter bed in the form of a hydrocarbon oil vapor which is discharged into the atmosphere by the exhaust gases of the sintering process. Because of present day air pollution regulations which forbid the discharge of hydrocarbon vapors into the atmosphere, the steel industry is faced with the possibility of not being able to use large tonnages of oil-bearing mill scale in sintering operations. Furthermore, the use of oil-bearing mill scale in a sintering operation results in excessive coating and fouling of the fans in the gas circulation system so that periodic shutdowns are necessary in order to clean the fans.

SUMMARY OF THE INVENTION

The broad object of the present invention is to provide an improved system for utilizing valuable mill scale as a component of a sinter mix which avoids the problems heretofore encountered with air pollution.

More specifically, the object of the invention is to provide a novel process and apparatus for deoiling and agglomerating mill scale to form deoiled pellets suitable for use in a sinter mix without objectionable evolution of oil vapors during the sintering process.

In general, the foregoing objects of the invention are accomplished by (a) forming a mix of oil-bearing mill scale and calcined lime fines; (b) balling the mix to form green mill scale-lime pellets; and (c) heating the green pellets in an oxidizing atmosphere to a temperature sufficient to effect ignition and substantially complete combustion of the oil in the pellets. In most cases it is preferred to dry the green pellets from step (b) at a low temperature prior to heating in step (c).

Although the foregoing steps can be carried out using conventional mixing, balling, and heating apparatus, the invention also relates to a novel apparatus for preliminary drying of the green pellets and subsequent heating of the pellets to effect flash burning of the oil content of the pellets. In accordance with the invention, the heating and flash burning of the pellets can also be carried out by modification of a conventional sintering line.

DETAILED DESCRIPTION

Figure 1:
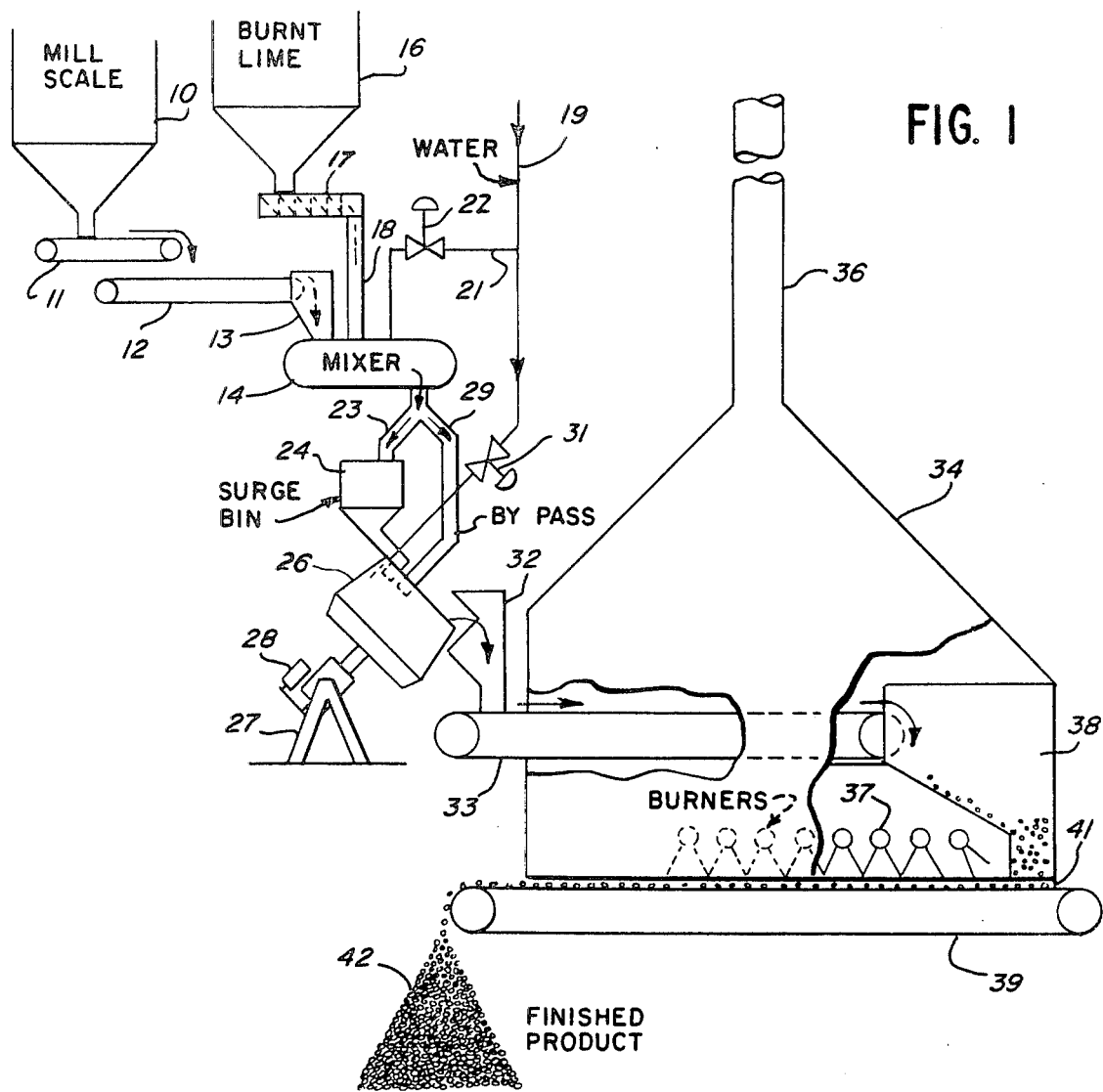
FIG. 1 is a schematic elevational view of a preferred apparatus for carrying out the process of the invention.

The present invention provides a flash burning process in which specially prepared green mill scale-lime pellets are exposed to a heat source having a predetermined temperature at which volatilization or fuming of the oil contained in the pellets is avoided by ignition and substantially complete combustion of the oil content of the pellets. Because of the moisture content of the green pellets, it could be expected that rapid exposure of the pellets to high temperature heat treatment would result in explosive formation of steam and resultant disintegration of the pellets. Surprisingly, however, it has been found that rapid ignition of the pellets occurs such that each pellet is surrounded or enveloped by flames resulting in effective removal of moisture and combustion of oil without destroying or impairing the structural integrity of the pellets.

An important feature of the pellet preparation is the initial mixing step in which the mill scale is blended and mechanically scoured with calcined lime fines so as to remove the moisture, oil, and fine mill scale particles from the coarse mill scale particles. In the subsequent balling of the mill scale-lime mixture, pellets are formed in which most of the oil (for example, up to 75%) contained in the original mill scale is present in a surface layer of each pellet. The transfer of the oil to the surface of the pellets is readily accomplished by the balling action in which the lime fines containing the moisture, oil, and fine mill scale particles are deposited on the surface of the coarse mill scale particles.

The mill scale is mixed with calcined lime fines in any suitable mixing apparatus, such as a horizontal drum mixer. In general, from about 3% to about 16% calcined lime fines may be used, dependent upon the moisture content of the mill scale. If required, water may also be added in the mixing step to facilitate pellet formation in the subsequent balling step.

Although as-is mill scale can be used in the mixing step, it has been found that the oil content of the mill scale tends to concentrate in the finer particles. Accordingly, it is preferred to subject the mill scale to preliminary screening to separate a fine particle size fraction having a higher oil content from a coarse particle size fraction having a substantially lower oil content, and only the fine particle size fraction is then blended with calcined lime fines in the mixing step. For example, by screening the as-is mill scale to separate a +¼ inch fraction from a −¼ inch fraction, the oil content of the −¼ inch fraction may be approximately twice that of the +¼ inch fraction. If desired, the −¼ inch fraction may be screened further to separate −°mesh material from +°mesh material, in which case the −20 mesh material may have an oil content on the order of twice the oil content of the +20 mesh material.

It has been found that the screenability of mill scale is considerably affected by its moisture content. Table I shows the results obtained by screening several −¼ inch fractions of mill scale of varying moisture content using a 20 mesh Sweco screen.

TABLE I

| | −¼" Mill Scale 6% Moisture | | −¼" Mill Scale 5% Moisture | | −¼" Mill Scale 2% Moisture | |
|---|---|---|---|---|---|---|
| | Wt.% | % Oil | Wt.% | % Oil | Wt.% | % Oil |
| +20M | 85 | 0.4 | 77 | 0.3 | 48 | 0.3 |
| −20M | 15 | 0.8 | 23 | 0.7 | 52 | 0.6 |

As can be seen, screening of the 6% moisture mill scale yielded only 15% of the desired −20 mesh material of high oil content, whereas screening of the 2% moisture mill scale yielded 52% of the −20 mesh material.

The screenability of the higher moisture content mill scale fractions can be improved, however, by blending the mill scale with calcined lime fines prior to screening. The lime fines combine readily with the moisture content in the mill scale, thereby effecting a chemical drying action which permits the recovery of a much higher percentage of −20 mesh material in the screening operation. Table II shows the results obtained by screening 100 pound batches of lime-dried mill scale using a 20 mesh Sweco screen.

TABLE II

| | −¼" Mill Scale 6% Moisture + 8% Lime | | −¼ Mill Scale 5% Moisture + 7% Lime | |
|---|---|---|---|---|
| | Wt.% | % Oil | Wt.% | % Oil |
| +20M | 59 | 0.3 | 46 | 0.2 |
| −20M | 41 | 0.7 | 54 | 0.7 |

As seen from the foregoing data, the results obtained by pre-mixing suitable amounts of lime with mill scale of 5–6% moisture content are comparable to those shown in Table I when using mill scale of 2% moisture content without preliminary blending of lime.

In the second step of the process, the mix of mill scale and calcined lime fines is formed into pellets by a balling action carried out in any suitable type of balling drum or disc pelletizer, such as those used in a sintering plant for balling an iron ore mix. On a smaller scale, a conventional cement mixer also gives satisfactory results. If required, water may be added to the mix in the balling step in order to facilitate the balling action. The resultant green pellets are usually about ¼ inch in size and may have a moisture content ranging from about 6% to about 9% and an oil content of from about 0.5% to about 1.0%.

Other materials may also be incorporated in the pellets by adding the same in either the mixing step or the balling step, preferably the latter. For example, hydrated lime dolomitic lime and waste products having a substantial iron content, such as BOF dust, may be added. Blast furnace dust may be added in limited amounts of from about 1% to about 3%. Coke breeze may also be added in similar amounts to facilitate the combustion of the oil in the final flash burning step.

Although not always necessary, in most cases it will be desirable to dry the green pellets before the flash burning step to reduce the moisture content of the pellets below about 6%. This reduction in moisture content facilitates continuous feeding of the green pellets from a feed hopper or the like into the heating apparatus for flash burning of the oil in the pellets. Since the presence of lime in the pellets accomplishes a rapid chemical drying action, it will be sufficient in some cases to allow the pellets to dry in ambient air, but the drying action can be enhanced by blowing ambient air over or through the green pellets by means of a suitable fan or blower.

In most cases, however, it is desirable to effect drying of the green pellets by contacting the pellets with a hot gas at a temperature sufficient to reduce the moisture content of the pellets without any substantial volatilization of the oil. As hereinafter described, hot combustion gas at a temperature of from about 600° F. to about 650° F. is particularly suited for this purpose, but the actual pellet temperature should not exceed about 250° F. A convenient source of hot combustion gas is the combustion gas from the burners used in the final pellet heating step of the process. By this procedure, green pellets having a moisture content, for example, of from about 6% to about 9% may be dried rapidly to a moisture content of from about 2% to about 4%. The resultant dried green pellets have a good compression strength, for example, on the order of about 7 to 8 pounds, which is considerably higher than that of green pellets normally used for the production of fired pellets in conventional agglomeration processes.

In the final heating step of the process, the green pellets are heated in an oxidizing atmosphere to a temperature sufficient to effect ignition and substantially complete combustion of the oil in the pellets. This desired result is obtained by exposing the pellets to a heat source having a temperature in excess of about 1200° F. The preferred heat source is a burner flame having a temperature of from about 1500° F. to about 2000° F. In a continuous process, one or more burner flames are directed generally downwardly and impinged on the surface of a continuously moving pellet bed. Dependent upon the apparatus used, the pellet bed thickness may be from about one inch to about three inches, and the time of exposure of the pellets to the flame may be from about ½ minute to about 2 minutes. Under such conditions, it has been found that complete or substantially complete removal and combustion of the oil content of the pellets is obtained while the actual pellet bed temperature does not exceed about 650° F. The final deoiled pellets have an oil content of less than about 0.1% with excellent compression strength on the order of about 10–12 pounds.

An important advantage of the invention is that the specially prepared green pellets can be subjected to heating and flash burning in relatively simple and inexpensive apparatus requiring minimum fuel consumption. Prolonged high temperature heating to effect exothermic oxidation of the iron oxide in the pellets, as in the conventional production of indurated pellets, is not necessary for purposes of the present invention, and the resultant deoiled pellets have adequate compression strength so that they can be included as a component of the mix for a sintering line without objectionable air pollution and other problems encountered when ordinary mill scale is added to the sinter mix. Nevertheless, if indurated and deoiled pellets are desired for any reason, the heating step in the present invention can be suitably modified to accomplish such result. In the latter case, it is particularly desirable to incorporate coke breeze in the green pellets, as heretofore described, in order to provide extra fuel for the increased degree of heating required for induration of the pellets.

In general, the invention contemplates the use of any suitable furnace, kiln, or other heating apparatus for heating the green pellets. For example, highly satisfactory results have been obtained using vibratory feeder equipment in which the green pellets were discharged from a feed hopper into an inclined trough-shaped vibratory feeder having a hood section provided with a burner for directing flames downwardly against the moving pellet bed. Excellent results have also been obtained with an apparatus comprising an elongated pan conveyor with a feed hopper for the controlled discharge of pellets located at one end of the conveyor. The pellets were moved on the pan conveyor beneath an elongated hood provided with a plurality of downwardly directed burners arranged so that the burner flames impinged upon and penetrated the pellet bed.

A preferred commercial apparatus for practicing the invention is illustrated schematically in FIG. 1. Mill scale of $-\frac{1}{4}$ inch size is fed from a storage bin 10 to a conveyor 11 and is deposited onto another conveyor 12 which discharges into a feed chute 13 for supplying the mill scale to a horizontal drum mixer 14. Calcined lime fines or burnt lime is fed from a storage bin 16 by means of a screw conveyor 17 and is introduced through a feed conduit 18 into the mixer 14. The mill scale and lime are intimately blended in the mixer 14 with the addition of water through spray nozzles (not shown) supplied by a line 19 and a branch line 21 having a control valve 22, whereby to obtain a moisture content of about 4–5% in the mix. The mix may contain about 8–16% lime fines, preferably about 10%.

The mill scale-lime mix is fed from the mixer 14 through a branch conduit 23 into a surge bin 24 which discharges into a deep pelletizing pan 26 mounted for rotation on a support 27 and driven by a motor 28. A portion of the mix may be fed directly from the mixer 14 to the pelletizing pan 26 through a by-pass conduit 29. Additional water is added to the pelletizing pan 26 through spray nozzles (not shown) supplied by line 19 having a control valve 31. Balling of the mix is accomplished in the pelletizing pan 26 to obtain green pellets having a size of approximately $\frac{1}{4}$ inch and a moisture content of about 7–8%.

The green pellets overflow from the rim of the rotating pelletizing pan 26 into a vertical feed chute 32 which discharges the pellets onto one end of an elongated wire cloth conveyor belt 33 having 20 mesh size openings. The conveyor belt 33 extends horizontally into the upper portion of an enlarged enclosure or hood 34 having an exhaust stack 36, and partial drying of the pellets is accomplished by upwardly rising combustion gases from a series of burners 37 located in the lower portion of the hood 34. The combustion gases may have a temperature of about 600°–650° F., although the actual temperature of the pellets on the conveyor belt 33 will not exceed about 250° F. By this means the green pellets are dried rapidly to a moisture content of about 2% without any substantial volatilization or fuming of the oil content of the pellets.

The dried green pellets are discharged from the opposite end of the conveyor belt 33 into the upper end of a feed hopper 38 located adjacent one side of the hood 34. The lower discharge end of the feed hopper 38 is disposed over the feed end of an elongated pan conveyor 39 mounted below the hood 34. The feed hopper 38 is provided with an adjustable cut-off plate (not shown) in a conventional manner for regulating the thickness of the pellet bed 41 as the pellets are fed by gravity onto the pan conveyor 39. Preferably, the pellet bed thickness is from about 1 inch to about 1½ inches.

The burners 37 comprise a plurality of ribbon burners extending over about two-thirds of the length of the pan conveyor 39. The flame temperature of the burners is maintained preferably at from about 1800° F. to about 2000° F. The burners 37 are positioned above the surface of the pellet bed 41, and the flames are directed downwardly and penetrate into the pellet bed. As indicated at the extreme righthand burner 37, some of the burners may be positioned at a 45° angle to the pellet bed to provide a flame shield for insuring combustion of any oil fumes that might otherwise escape from the pellet bed. In addition, some of the burner 37 may be supplied with air alone, instead of air and fuel, to impart a rolling or agitating action to the ignited pellets. By this means, the total surface area of the pellets is rapidly exposed to the source of heat to enhance ignition and flash burning.

The time of exposure of the pellet bed to the burner flames is regulated by the speed of the pan conveyor 39. In a typical operation, the pan conveyor speed may be from about 6 to about 8 feet per minute during which time the surface of the pellet bed 41 reaches a temperature of from about 550° F. to about 600° F. The deoiled pellets on the pan conveyor 39 are cooled rapidly to about 300° F. as the pellets are moved past the burner section, and the finished pellets are discharged from the pan conveyor 39 onto a storage pile 42. In most cases, however, a rubber belt conveyor will receive the finished pellets from the pan conveyor 39 and discharge the same into trucks or other receptacles for delivery to the sintering plant.

Figure 2:
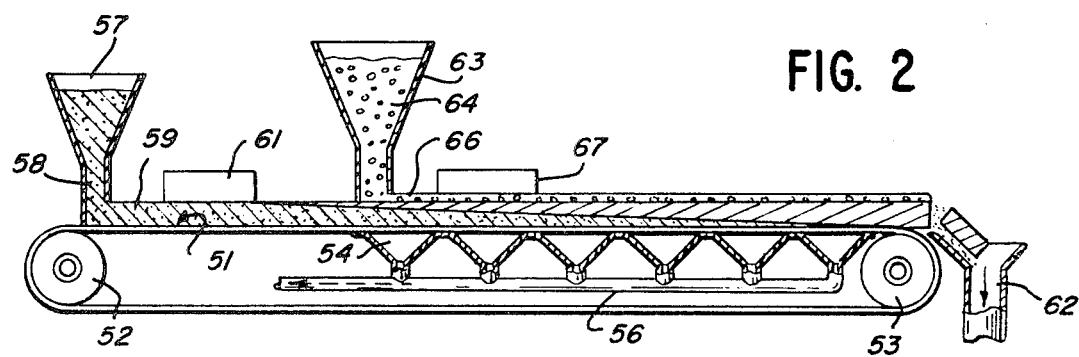
FIG. 2 is a schematic elevational view of a modified sintering apparatus for carrying out the flash burning step of the invention.

FIG. 2 is a schematic illustration of how the pellet heating step of the present invention can be carried out on a conventional sintering line.

The sintering line comprises an endless conveyor grate 51 extending between a pair of drive rolls 52 and 53. Below the grate 51, a plurality of wind boxes 54 are positioned and are connected with suitable suction fans (not shown) by a conduit 56 to provide the required draft through the sinter bed. At the forward end of the sintering line, a sinter mix feed hopper 57 is positioned above the grate 51 with a discharge outlet 59 disposed adjacent the surface of the grate 51. A sinter mix bed 59 is deposited on the moving grate 51 and passes beneath an adjacent ignition hood 61 which ignites the fuel in the sinter mix as a downwardly flowing draft is maintained through the bed 59 by the wind boxes 54. As indicated schematically in the drawing, burning of the sinter mix bed 59 progresses gradually throughout the length of the moving grate 51, and the final sinter product is discharged from the end of the grate 51 into a conduit 62 for use in preparation of a blast furnace charge.

In accordance with the present invention, an auxiliary feed hopper 83 is mounted above the grate 51 immediately downstream from the hood 61 and contains a supply 64 of green mill scale-lime pellets prepared as previously described. The green pellets are fed from the hopper 63 and are deposited as a thin layer 66 on top of the ignited sinter bed 59. Typically, the sinter bed 59 may have a thickness of 14 to 15 inches, and the pellet layer 66 may have a thickness of one to three inches. As the grate 51 moves forward, the sinter bed 59 and the superimposed pellet layer 66 pass beneath another ignition hood 67 which effects ignition of the oil contained in the pellets. The deoiled pellets are discharged together with the conventional sinter product, and the mixture can then be screened and the deoiled pellet fraction along with sinter fines can be recycled as part of the feed to the sinter mix supply hopper 57.

If desired, a single final product may be obtained by adding BOF slag fines, blast furnace flue dust, or similar material to the pellet layer 66 so as to adjust the basicity of the pellet layer 66 to that of the sinter bed 59. Complete sintering of both the pellet layer and the sinter bed are then accomplished to obtain the desired single final product.

For purposes of further illustration of the invention, the following non-limiting examples are presented.

EXAMPLE 1

Various mixtures of mill scale and calcined lime fines were prepared and pelletized in a cement mixer. The compositions of the test pellets and feed materials were as follows:

Pellet A 90%—¼" mill scale +10% calcined lime fines. The mill scale had a moisture content of 5% and analyzed 0.48% oil.

Pellet B 86%—¼" mill scale +7% lime dust +7% calcined lime fines. The mill scale had a moisture content of 5% and analyzed 0.48% oil. The lime dust consisted of only partially calcined lime fines.

Pellet C 90%—¼" mill scale +9% calcined lime fines +1% coke breeze. The mill scale had a moisture content of 4.5% and an oil content of 0.48%.

Pellet D 80%—¼" mill scale +10% high oil bearing mill scale sludge +10% calcined lime fines. The mill scale had a moisture content of 4.5% and an oil content of 0.48%, while the mill scale sludge contained 13% moisture and analyzed 2.1% oil.

Pellet E 88% mill scale of −20 mesh size +12% calcined lime fines. The −20 mesh mill scale contained 0.85% oil and was obtained by first combining −¼" mill scale with 7% lime fines and then screening the chemically dried material on a 20 mesh screen.

Feed F Mixture of 50% +20 mesh mill scale + 50% Pellet E. The +20 mesh mill scale was obtained by screening a −¼" mill scale-lime mixture on a 20 mesh screen. The −20 mesh size fraction was then used for the preparation of Pellet E. The +20 mesh scale material produced by the screening operation was essentially dry and contained only 0.20% oil.

The various pellets were dried in ambient air, and the pellets and feeds were deoiled continuously in an apparatus in which the pellets were discharged by gravity from a hopper onto a trough-shaped vibratory feeder. By the vibrating action of this feeder, the mill scale-lime pellets were moved at a uniform rate to a hooded section of the feeder which was provided with a burner. The combustion flame of this burner was set at a predetermined temperature of 1500–1800° F.

The pellets were processed on the metal trough conveyor at a bed depth of 1 to 1.5 inches and yielded an essentially oil-free product at a throughput rate of 130–170 lbs. per hour. The temperature of the pellet bed did not exceed 600° F., and the temperature of the deoiled products varied from 260° F. to 290° F. The oil removal from the mill scale was accomplished at a rapid rate since the pellets were exposed to the heat source for less than 60 seconds.

No operating difficulties were encountered in feeding, conveying or in any of the other processing steps. The pellets did not disintegrate when exposed to the temperature of the flame, and there were no oil fumes visible during any of the processing stages.

The oil content of the products after deoiling are set forth in Table III, as follows:

TABLE III

| Product | Wt. % Oil |
| --- | --- |
| Pellet A | .02 |
| Pellet B | nil |
| Pellet C | .01 |
| Pellet D | nil |
| Pellet E | nil |
| Feed F | .04 |

Since the process of deoiling mill scale by the present invention requires relatively simple and inexpensive equipment, the potential savings in equipment cost are very significant when compared with the cost of equipment that would be incurred for deoiling mill scale by other processes. The total fuel requirements are minimal since the heat of combustion of the oil contained in the pellets supplies a large fraction of the total heat required for deoiling. The tests with Pellet C showed that coke breeze or blast furnace flue dust can be incorporated inside the pellets during the balling step, and therefore it is entirely feasible to carry out the process with a minimum volume of gaseous fuel. The method of handling and exhausting the products of combustion is greatly simplified in the present invention since the total volume of combustion gases resulting from the process amounts to only a small fraction of the total gas volume normally required for heating of the mill scale and for the combustion of the oil fumes when using other methods.

The results of the tests also showed that by using the flash burning process it was possible to produce not only a deoiled mill scale but also a physically improved feed material for a sintering operation. The benefits of using the deoiled pellets for sintering were established in a series of sintering tests. These tests showed that the sintering rate obtained with a blend containing 25% mill scale-lime pellets was 15% higher than that obtained with a blend containing 25% as-is mill scale. These results are significant, since they indicate that by introducing the calcined lime fines into the sinter feed by using the deoiled mill scale-lime pellets, the need for additional expenditures for a large balling drum (for balling of 100% of the sinter feed) and a lime storage bin in the sinter plant can be avoided.

EXAMPLE 2

A series of semi-commercial scale tests were carried out using a 9 cubic yard horizontal mixing drum for the mixing step, two 3 cubic yard cement mixers for the balling step, and a pan conveyor 5 feet wide and 40 feet long for the pellet heating step. A feed hopper was provided at the feed end of the conveyor, and a burner hood equipped with six gas burners and two exhaust fans was disposed over the conveyor.

As-received mill scale (−¼") having a moisture content of 4.8% and an average oil content of 0.46% was picked up from a stockpile with a front-end loader and transferred to a storage hopper. From this hopper, the mill scale was discharged onto a rubber conveyor belt for transfer into the horizontal mixing drum. Batches of approximately six tons of mill scale were charged into the mixing drum for blending with 1,200 lb. batches of calcined lime fines. The lime fines required for this purpose were fed, as needed, from a surge hopper to the mixing drum through a removable chute.

The screen analyses of the mill scale and calcined lime fines used in these tests are shown in Tables IV and V.

TABLE IV

| | Screen Analyses of Mill Scale, Wt. % | | | | | | |
|---|---|---|---|---|---|---|---|
| Sample No. | 1 | 2 | 3 | 4 | 5 | 6 | Average |
| +¼" | 0.6 | 2.9 | 1.2 | 2.8 | 3.1 | 0.8 | 1.9 |
| −¼" + 6M | 12.2 | 17.2 | 10.2 | 14.3 | 10.4 | 9.5 | 12.3 |
| −6 + 20M | 39.3 | 33.8 | 35.7 | 43.1 | 32.4 | 40.4 | 37.5 |
| −20M | 47.9 | 46.1 | 52.9 | 39.8 | 54.1 | 49.3 | 48.3 |
| | 100.0 | 100.0 | 100.0 | 100.0 | 100.0 | 100.0 | 100.0 |

TABLE V

| | Screen Analyses of Calcined Lime Fines, Wt. % | | | | | | |
|---|---|---|---|---|---|---|---|
| Sample No. | 1 | 2 | 3 | 4 | 5 | 6 | Average |
| +¼" | 0.3 | 0.4 | 0.6 | 0.7 | 0.1 | 0.7 | 0.5 |
| −¼" + 6M | 2.5 | 1.2 | 2.8 | 3.1 | 0.9 | 2.3 | 2.1 |
| −6 + 20M | 45.4 | 51.1 | 30.4 | 38.0 | 30.2 | 31.8 | 37.8 |
| −20M | 51.8 | 47.3 | 66.2 | 58.2 | 68.8 | 65.2 | 59.6 |
| | 100.0 | 100.0 | 100.0 | 100.0 | 100.0 | 100.0 | 100.0 |

During blending of the mill scale with the lime fines, spray nozzles were used for introducing into the mixing drum the water which was required for preparing a mill scale-lime mixture of 4–5% moisture content. The addition of the predetermined amount of water was controlled by a water flowmeter.

The prepared mill scale-lime mixture was formed into pellets by balling it in the cement mixers. During the balling step, the moisture content of the mill scale-lime mixture was gradually increased to approximately 8% by the addition of water with spray nozzles. The wet pellets, which had moisture contents varying from 7.6%–8.7%, were transferred to a steel plate pad for partial drying purposes. On this pad, the partial removal of the moisture from the pellets was accomplished by blowing onto their surface a stream of ambient air provided by an air fan. Since the surface of the pellets dried rapidly, it was possible to prevent sticking of the pellets into lumps during their storage on the metal pad. After being dried to a moisture content of approximately 3%, the pellets were used for the continuous deoiling tests.

The screen analyses of the air dried pellets are shown in Table VI.

TABLE VI

| | Screen Analyses of Air Dried Pellets, Wt. % | | | | | | |
|---|---|---|---|---|---|---|---|
| Sample No. | 1 | 2 | 3 | 4 | 5 | 6 | Average |
| +¼" | 33.4 | 41.7 | 34.0 | 39.4 | 30.8 | 34.7 | 35.7 |
| −¼" + 6M | 36.9 | 29.5 | 29.3 | 33.1 | 41.6 | 32.4 | 33.8 |
| −6 + 20M | 24.3 | 23.2 | 33.8 | 24.1 | 23.8 | 26.2 | 25.9 |
| −20M | 5.4 | 5.6 | 2.9 | 3.4 | 3.8 | 6.7 | 4.6 |
| | 100.0 | 100.0 | 100.0 | 100.0 | 100.0 | 100.0 | 100.0 |

The dried green pellets were removed from a storage pile with a front-end loader and charged into the feed hopper of the pan conveyor system. Discharging of the pellets from the feed hopper onto the moving pan conveyor was accomplished by gravity flow, and the height of the bed deposited on the pan conveyor was controlled with an adjustable plate which was attached to the bottom section of the hopper. After a series of preliminary tests, it was decided to maintain a one inch opening between the plate and the pan conveyor in order to deposit a bed of pellets of the desired thickness.

The pellet bed was passed under the hood with the burners maintained at temperatures of 1800° F.–2000° F. The distance of the burners from the pellet bed was adjusted to a level at which the flames could penetrate the bed of pellets. The volume of air supplied to the burners was maintained at approximately 140% of the theoretical air required for the complete combustion of the natural gas used as the burner fuel. Five of the burners were supplied with both natural gas and air, while one burner was supplied with air only. The air-blast burner, positioned at a 45° angle after the three front burners, was used for providing a rolling action for the hot pellets before they reached the other two burners. During the rolling action, it was possible to flash off and burn any oil fumes which had condensed in the bottom layer of the pellet bed. The retention time of the pellets under the burner hood was approximately 1.5 minutes.

The deoiled pellets cooled rapidly and had a temperature of 300° F. when discharged from the pan conveyor onto a rubber conveyor belt. The pellets were transferred by this conveyor belt directly into a truck.

The screen analyses of the deoiled pellets are shown in Table VII.

TABLE VII

| | Screen Analyses of Deoiled Pellets, Wt. % | | | | | | |
|---|---|---|---|---|---|---|---|
| Sample No. | 1 | 2 | 3 | 4 | 5 | 6 | Average |
| +¼" | 23.6 | 27.8 | 16.3 | 24.1 | 21.6 | 20.2 | 22.3 |
| −¼" + 6M | 28.4 | 25.3 | 27.0 | 27.6 | 20.8 | 22.1 | 25.2 |
| −6 + 20M | 31.1 | 29.6 | 41.8 | 36.2 | 48.4 | 42.9 | 38.3 |
| −20M | 16.9 | 17.3 | 14.9 | 12.1 | 9.2 | 14.8 | 14.2 |
| | 100.0 | 100.0 | 100.0 | 100.0 | 100.0 | 100.0 | 100.0 |

The average moisture content and compression strength of the pellets at various stages are shown in Table VIII, and the average chemical composition of the raw materials and products are shown in Table IX.

TABLE VIII

| | Green | Air Dried | Deoiled |
|---|---|---|---|
| Average Moisture, Wt. % | 7.9 | 3.3 | 0.0 |
| Compression Strength, lbs. | 2.7 | 7.4 | 10.9 |

TABLE IX

| | Mill Scale (−¼") | Calcined Lime Fines | Deoiled Pellets (Low-Lime) | Deoiled Pellets (High-Lime) |
|---|---|---|---|---|
| Fe, wt. % | 71.2 | — | 62.6 | 57.2 |
| CaO, wt. % | — | 89.7 | 10.4 | 15.6 |
| Oil, wt. % | 0.46 | — | 0.07 | 0.09 |

The tests proved that it is technically feasible to produce pellets by balling a mixture of relatively coarse mill scale (−¼") and calcined lime fines. As can be seen from the data of Table IV, the mill scale used in the tests contained on the average 51.7% +20 M material. Balling test data showed that optimum results were obtained with mill scale-lime mixtures composed of 88%–92% mill scale and 8%–12% calcined lime fines. Pellets of the desired size distribution were produced from mixtures containing 7.6%–8.7% moisture.

The formed pellets had satisfactory compression strengths and did not degrade much during handling and storage. Air dried pellets of 3.3% moisture content had an average compression strength of 7.4 lbs, while the deoiled pellets had an average compression strength of 10.9 lbs. Pellets of an acceptable compression strength were also produced from mill scale-lime mixtures containing up to 16% calcined lime fines. Test data showed that the compression strength of the pellets decreased as their lime content was increased to above 16%. Partially dried pellets containing 16.6% lime fines had a compression strength of only 5.6 lbs.

The data of Tables VI and VIII show that the air dried pellets contained on the average 3.3% moisture and consisted of 35.7%+¼" and 4.6%–20 M material. No problems were encountered in handling and feeding the pellets through the feed hopper except that pellets of 6% moisture content or more were difficult to discharge uniformly from the feed hopper.

During the deoiling tests, a front-end loader was used for transferring the partially dried pellets from the storage pile to the feed hopper, and it was expected that this crude handling method would result in severe degradation of the pellets. Screen analysis of the deoiled product showed, however, that the degradation was not extensive. It can be seen from the data of Table VII that the deoiled pellets contained on the average only 14.2%–20 M material.

The data obtained in the deoiling tests showed that pellets of a ¾ inch to 1 inch bed thickness were deoiled readily by operating the pan conveyor at a speed of 6 feet per minute. Monitoring of the pellet bed temperature indicated that the temperature at the top of the bed varied from 540° F. to 650° F., while the temperature at the bottom of the bed varied from 310° F. to 420° F. At these operating conditions, throughput rates of up to 8.2 tons per hour of deoiled pellets were obtained. The deoiled pellets had an average oil content of 0.07%.

In a series of special deoiling tests which were carried out with pellets of 5% moisture content, it was found that the speed of the pan conveyor had to be reduced from 6 feet per minute to 4.7 feet per minute in order to obtain the desired oil removal. At a conveyor speed of 6 feet per minute, the deoiled product obtained from pellets of 5% moisture content analyzed 0.15% oil, while at a conveyor speed of 4.7 feet per minute it analyzed 0.06% oil. Similar results were also obtained with a mixture composed of 50% pellets of 8% moisture content and 50% pellets of 3% moisture content.

The detrimental effect of moisture on the oil removal and heat consumption rate was considerably reduced by mixing wet pellets of 7.6% moisture content with hot pellets which were recycled to the feed hopper. In a deoiling test carried out with a mixture of approximately 70% wet pellets and 30% recycled product, the deoiled pellets were produced at a rate of 7.9 tons per hour and analyzed only 0.04% oil. During processing of this mixture of pellets under the burner hood, it was observed that some of the pellets heated up preferentially and had a glowing surface. Thermocouple readings showed that the glowing pellets had a temperature of 1150° F., while the surrounding pellets had a temperature of only 460° F. It was also observed that, while passing under the air-blast burner (no flame), the rolling low-temperature pellets which came in contact with the surface of the hot pellets ignited spontaneously by flashing off their oil. It is believed that the recycled bone-dry pellets of the mixture heated up preferentially because of an exothermic reaction caused by the oxidation of the FeO contained in the fine mill scale on the surface of the pellets.

The heat consumption rate per ton of deoiled pellets produced depended mainly on the moisture content of the pellets used for deoiling. The highest heat consumption rate was obtained by processing pellets of 5% moisture content (720,000 Btu/ton), while the lowest heat consumption rate was obtained by processing a mixture of pellets containing 30% recycled pellets (445,000 Btu/ton). Air dried pellets of 3.3% moisture content were deoiled at an average heat consumption rate of 540,000 Btu/ton.

Monitoring and sampling of the exhaust gases during the deoiling operation showed that the removal of oil from the pellets on the pan conveyor by the flash burning process did not cause any air pollution problems. Analysis of the collected samples showed that the exhaust gases contained on the average 0.021 Gr/ft$^3$ particulates, 0.002 Gr/ft$^3$ $SO_2$ and 0.013 Gr/ft$^3$ hydrocarbons. The temperature of the exhaust gases varied from 580° F. to 670° F.

The semi-commercial deoiling tests showed that mill scale-lime pellets can be deoiled in relatively simple equipment by the flash burning process of the present invention. In comparison with other deoiling processes, such as the direct-fired and indirect-fired kiln processes, the method of the present invention has significant advantages since there is no need to provide special equipment for processing the hydrocarbons removed from the mill scale. Consequently, the pollution problems connected with the kiln deoiling processes can be avoided.

Moreover, in the direct-fired kiln process, the hydrocarbons contained in the exhaust gases discharged from the kiln have to be passed through special after-burner equipment in order to insure complete combustion of the hydrocarbon fumes. Since the temperature of the after-burner chamber has to be maintained at 1600° F., the exhaust gases leaving this chamber are at temperatures ranging from 750° F. to 950° F. In the indirect-fired kiln, specially designed cooling vessels are required for condensing the hydrocarbons removed from the kiln, and provisions have to be made for preventing the water pollution problems associated with the condensation and collection of hydrocarbons.

The air volume required for deoiling mill scale by the present invention is only a small fraction of the volume used in the direct-fired kiln process since both the removal and the combustion of the oil is accomplished in the bed of pellets. The experimental data showed that only 8,000 ft$^3$ of air was used per ton of deoiled pellets, while in the direct-fired kiln process the air requirements are in excess of 40,000 ft$^3$ per ton of deoiled mill scale. Because of the large volume of air used for deoiling mill scale in the kiln, a large quantity of heat contained in the exhaust gases is wasted.

I claim:

1. A process for deoiling and agglomerating oil-bearing mill scale which comprises the steps of:
   (a) blending and mechanically scouring oil-bearing mill scale with calcined lime fines to form a mix;
   (b) balling the resultant mix to form green mill scale-lime pellets; and
   (c) heating the green pellets in an oxidizing atmosphere to a temperature sufficient to effect ignition and substantially complete combustion of the oil in said pellets, whereby to form deoiled pellets suitable for use in a sinter mix without objectionable evolution of oil vapors during sintering.

2. The process of claim 1 wherein mill scale is screened to separate a course particle size fraction from a fine particle size fraction, and said fine particle size fraction is blended and mechanically scoured with calcined lime fines in step (a).

3. The process of claim 1 wherein after step (a) the resultant mix is screened to separate a fraction containing coarse particle size mill scale from a fraction containing fine particle size mill scale, and said latter fraction is balled in step (b).

4. The process of claim 1 wherein said mix is formed by blending said mill scale with from about 3% to about 16% calcined lime fines.

5. The process of claim 1 wherein water is added to said mix to facilitate balling.

6. The process of claim 1 wherein the oil in said green pellets is present predominantly in a surface layer of the pellet.

7. The process of claim 1 wherein at least one material selected from the group consisting of BOF dust, blast furnace dust, and coke breeze is also added during step (a) or step (b).

8. The process of claim 1 wherein, prior to step (c), said green pellets from step (b) are dried at a temperature sufficient to reduce the moisture content of the pellets without any substantial volatilization of the oil in said pellets.

9. The process of claim 8, wherein the moisture content of the dried green pellets is less than about 6%.

10. The process of claim 8 wherein said green pellets are dried by exposure to ambient air.

11. The process of claim 8 wherein said green pellets are dried by contacting the pellets with a hot gas.

12. The process of claim 11 wherein said hot gas comprises a combustion gas at a temperature of from about 600° F. to about 650° F.

13. The process of claim 1 wherein said green pellets are heated in step (c) by exposure to a heat source having a temperature in excess of about 1200° F.

14. The process of claim 13 wherein said heat source comprises a burner flame having a temperature of from about 1500° F. to about 2000° F.

15. The process of claim 14 wherein the combustion gas from said burner flame is used to dry the green pellets prior to step (c).

16. The process of claim 1 wherein the temperature of said pellets during step (c) does not exceed about 650° F.

17. The process of claim 1 wherein the oil content of said deoiled pellets obtained in step (c) is less than about 0.1%.

18. The process of claim 1 wherein step (c) is carried out by continuously moving a bed of said green pellets and impinging a burner flame against said bed.

19. The process of claim 18 wherein the thickness of said bed is from about 1 inch to about 3 inches, and the time of exposure of the pellets to said flame is from about ½ minute to about 2 minutes.

20. The process of claim 18 wherein said burner flame is directed generally downwardly against said bed of green pellets, combustion gas from said burner flame flows upwardly, and said green pellets are dried prior to step (c) by continuously moving a bed of said green pellets through the upwardly flowing hot combustion gas.

21. The process of claim 1 wherein step (c) is carried out by continuously depositing a layer of said green pellets onto the upper surface of a moving hot sinter mix bed, and thereafter igniting said layer.

22. The process of claims 11 or 12 wherein the temperature of said pellets during the drying step does not exceed about 250° F.

23. The process of claim 1 wherein step (a) is carried out by feeding oil-bearing mill scale and calcined lime fines to a mixer, and step (b) is carried out by introducing the preformed mix from step (a) into a balling drum or pelletizer.

24. The process of claim 1 wherein in step (a) the mill scale is blended and mechanically scoured with sufficient calcined lime fines to remove the moisture, oil, and fine mill scale particles from the coarse mill scale particles, and in step (b) the resultant mix is balled to form green pellets in which the calcined lime fines containing the moisture, oil, and fine mill scale particles are deposited on the surface of the coarse mill scale particles.

* * * * *